United States Patent [19]
Wright

[11] Patent Number: 6,052,466
[45] Date of Patent: Apr. 18, 2000

[54] ENCRYPTION OF DATA PACKETS USING A SEQUENCE OF PRIVATE KEYS GENERATED FROM A PUBLIC KEY EXCHANGE

[75] Inventor: Andrew S. Wright, Vancouver, Canada

[73] Assignee: Telefonaktiebolaget L M Ericsson (publ), Stockholm, Sweden

[21] Appl. No.: 08/919,728

[22] Filed: Aug. 28, 1997

[51] Int. Cl.[7] .................................................. H04L 9/22
[52] U.S. Cl. ............................ 380/262; 380/285; 380/44
[58] Field of Search ................................... 380/21, 48, 30, 380/44, 254, 260, 262, 265, 278, 282, 283, 285

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,956,863 | 9/1990 | Goss ........................................... 380/30 |
| 5,148,485 | 9/1992 | Dent .......................................... 380/46 |
| 5,222,140 | 6/1993 | Beller et al. . |
| 5,253,294 | 10/1993 | Maurer ...................................... 380/21 |
| 5,299,263 | 3/1994 | Beller et al. . |
| 5,319,712 | 6/1994 | Finkelstein et al. . |
| 5,438,622 | 8/1995 | Normile et al. . |
| 5,515,441 | 5/1996 | Faucher . |
| 5,546,464 | 8/1996 | Raith et al. ............................... 380/48 |

FOREIGN PATENT DOCUMENTS

| | | |
|---|---|---|
| 2 681 165 | of 0000 | France . |
| 24 14 144 | of 0000 | Germany . |
| 2 297 016 | 7/1996 | United Kingdom . |

OTHER PUBLICATIONS

Diffie, "The First Ten Years of Public–Key Cryptography", Proceedings of the IEEE vol. 76, No. 5, May 1988.

European Patent Office, Standard Search Report, Jun. 10, 1998, File No. RS 100645 US.

*Primary Examiner*—Gilberto Barron, Jr.
*Attorney, Agent, or Firm*—Jenkens & Gilchrist P.C.

[57] ABSTRACT

A first cipher stream generated from a private key negotiated as a result of a public key exchange is partitioned to form a sequence of secondary keys. The secondary keys are then indexed. In one instance, each plaintext data packet is encrypted with a second cipher streams generated from a different one of the secondary keys. In another instance, a second cipher stream generated from a single secondary key is used to encrypt a plurality of plaintext data packets. A new second cipher stream generated from another one of the secondary keys is then used for encryption following each instance of the loss of a ciphertext data packet. The index is communicated with the ciphertext to identify which secondary key is to be used in generating the second cipher stream needed for decryption. With knowledge of the secondary key to be used, re-synchronization (along with new private key negotiation) at each instance of a ciphertext data packet loss is obviated.

20 Claims, 5 Drawing Sheets

ENCRYPTION OF DATA PACKETS USING A SEQUENCE OF PRIVATE KEYS GENERATED FROM A PUBLIC KEY EXCHANGE

BACKGROUND OF THE INVENTION

1. Technical Field of the Invention

The present invention relates to communications and, in particular, to encrypting communications for transmission over unsecured communications channels using public key/private key techniques.

2. Description of Related Art

Communications take place over many different types of channel media such as wireline, radio frequency, fiber optic, and the like. The communications carried over each of these media are, however, subject to interception (commonly referred to as "eavesdropping"). In instances where a communication concerns sensitive or proprietary information, it is common for the parties to the communication to employ a security protocol (such as encryption or scrambling) in order to prevent the eavesdropper from being able to discover the communicated information.

In encryption, a plaintext message is encrypted by a sender into a ciphertext message using a key (cryptovariable) and then sent over a communications channel. A receiver then decrypts the communications channel transmitted ciphertext message using the same key. An eavesdropper, who presumably does not have access to the key, cannot decrypt the transmitted ciphertext message to recover the plaintext message. Any sensitive or proprietary information contained within the plaintext message is thus safely communicated.

It is not unusual for the sender and receiver to be located at a considerable distance from each other. In such cases, a number of problems arise in ensuring that the designated key necessary for decryption is securely communicated to the receiver. A secure channel, such as a courier service, may be used to communicate the key. However, such channels tend to be expensive, slow, and perhaps even unsecured in instances where the trustworthiness of the courier is compromised.

To address this problem of key distribution, public key methods have been developed for security protocols wherein a sender and receiver may independently determine a common secret key by exchanging information based on secret parameters known only to them. The information that is exchanged is known as "public keys", and although subject to intervention the common secret key cannot be determined by the eavesdropper without having access to the secret parameters. One such well known public key encryption scheme is the Diffie-Hellman algorithm. See, U.S. Pat. No. 4,200,770, to Hellman, et al. and U.S. Pat. No. 4,218,582, to Hellman, et al.

Figure 1:
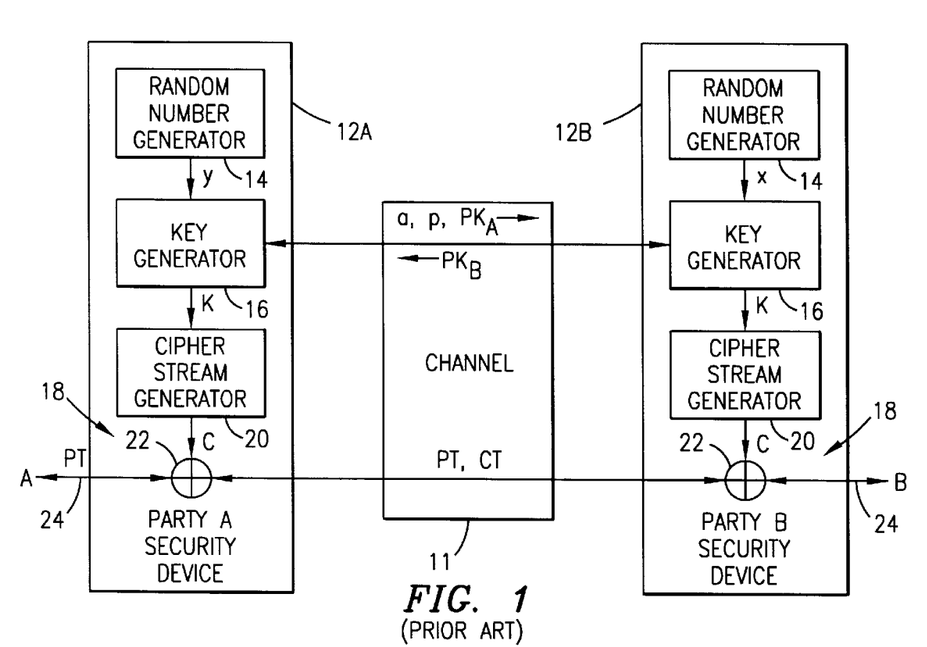
FIG. 1 (previously described) is a block diagram of a secure communications system in accordance with the prior art which implements the Diffie-Hellman public key encryption technique.
Figure 2:
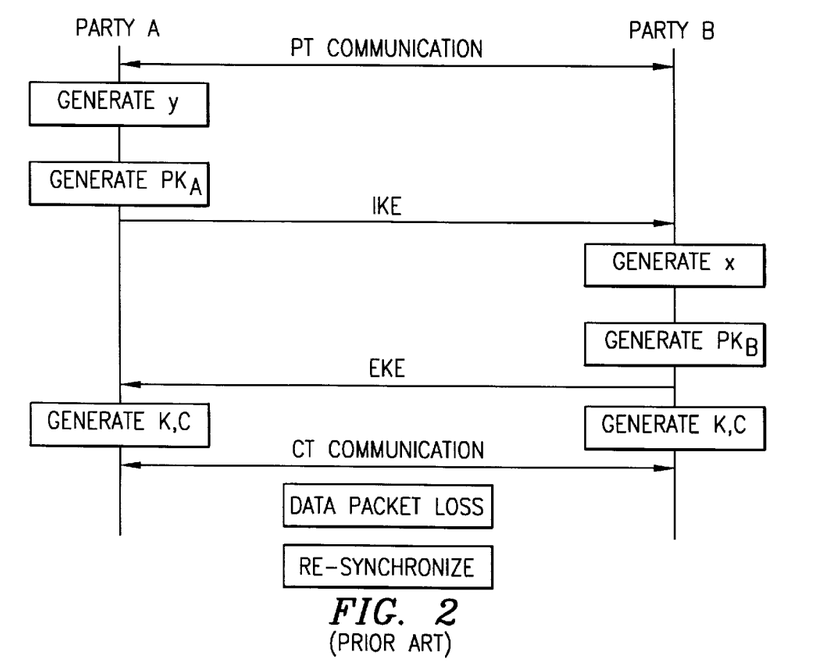
FIG. 2 (previously described) is a signal flow diagram illustrating prior art key exchange, encrypted data communication, and re-synchronization processes.

Reference is now made to FIGS. 1 and 2 wherein FIG. 1 is a block diagram of a secure communications system 10 in accordance with the prior art which implements the Diffie-Hellman public key encryption technique, and FIG. 2 is a signal flow diagram illustrating prior art key exchange, encrypted data communication, and re-synchronization processes. There are two parties, Party A and Party B, to a conversation which is being carried over an unsecured communications channel 11 supported by, for example, a wireline, radio frequency, fiber optic, or the like, communications link. Each party has access to a security device 12 positioned at opposite ends of the communications channel 11. Each security device includes a random number generator 14, a key generator 16 and an encryption/decryption device 18 (implementing a stream cipher such as RC4). The encrypting/decrypting device 18 comprises a cipher stream generator 20 and an exclusive OR (XOR) multiplier 22.

A data communication (perhaps comprising digitized speech or data in the form of data packets) referred to as plaintext (PT) is being carried between Party A and Party B on lines 24 and over the channel 11. At this point in time, plaintext is being passed directly (i.e., without encryption) through the encrypting/decrypting device 18. It is then decided to encrypt the communication. The random number generator 14 of the security device 12A for Party A produces a secret random quantity y. Key generator 16 then generates two public quantities:

a, referred to as a base vector, which is an integer; and p, referred to as a modulus, which is a prime number larger than a.

From these public quantities and the secret random quantity, the key generator 16 for Party A generates a public key $PK_A$ in accordance with the following:

$$PK_A = a^y \bmod p \tag{1}$$

The security device 12A then initiates a key exchange with the security device 12B for Party B. A triplet $(a, p, PK_A)$ is sent by the security device 12A to the security device 12B over the communications channel 11 in a key exchange message (IKE). It will be understood that to the extent a and p are previously agreed upon by Party A and Party B, they do not need to be included in the key exchange message. It will be noted here that the key exchange message is being sent without encryption. However, this is of no concern as the function for computing $PK_A$ is a one-way function (i.e., it is mathematically impossible for an eavesdropper to determine the secret random quantity y from knowledge of $PK_A$).

In response to the key exchange message, the security device 12B for Party B has its random number generator 14 produce a secret random quantity x. Key generator 16 then generates for Party B a public key $PK_B$ in accordance with the following:

$$PK_B = a^x \bmod p \tag{2}$$

The security device 12B then completes the key exchange with the security device 12A for Party A. The public key $(PK_B)$ is sent by the security device 12B to the security device 12A over the communications channel 11 in a key exchange response message (EKE). It will be noted again that the key exchange response message is being sent without encryption. Again, this is of no concern as the function for computing $PK_B$ is a one-way function, and thus the eavesdropper cannot utilize mathematical processing to determine the secret random quantity x from knowledge of $PK_B$.

The key generators 16 of the security devices 12 for Party A and Party B now independently generate a shared private key K in accordance with the following:

$$K = a^{xy} \bmod p \tag{3}$$

The key generator 16 for the Party A security device 12A generates K as follows:

$$K = a^{xy} \bmod p = PK_B a^y \bmod p \tag{4}$$

Similarly, the key generator 16 for the Party B security device 12B generates K as follows:

$$K = a^{xy} \mod p = PK_A a^x \mod p \tag{5}$$

While the security devices 12A and 12B are able to independently generate the same secret key K, it will be recognized that an eavesdropper is unable to compute the private key, in spite of having access to the public keys $PK_A$ and $PK_B$, because knowledge of the necessary secret random quantities x and y is unknown and cannot be mathematically determined. The private keys K are then applied to initialize the cipher stream generators 20 which output a cipher stream C that is either exclusively ORed 22 with the plaintext (PT) to generate ciphertext (CT) for transmission over the channel 11, or exclusively ORed with received ciphertext to generate the original plaintext.

For a bi-directional data communication between Party A and Party B as illustrated in FIG. 1, the secret key K actually comprises (i.e., may be split into) two keys $K_{AB}$ and $K_{BA}$. The first private key $K_{AB}$ is used by security device 12A to generate a cipher stream for encrypting Party A data communications, and by security device 12B to generate a cipher stream for decrypting Party A data communications. Conversely, the second private key $K_{BA}$ is used by security device 12B to generate a cipher stream for encrypting Party B data communications, and by security device 12A to generate a cipher stream for decrypting Party B data communications. The need for two private keys when handling bi-directional communications is required to ensure that the same generated cipher stream is never used for the encryption of different plaintext sequences.

Once the cipher stream generators 20 are initialized with the appropriate private key K, they must remain synchronized in order to ensure proper conversion between plaintext and ciphertext. The communications channel accordingly must be able to guarantee an ordered (i.e., correctly sequenced) delivery of any encrypted sequenced data packets so that synchronization may be maintained. In the event synchronization is lost, for example due to a loss of an encrypted data packet during transmission over the channel 11, re-synchronization followed by encryption with a new private key must occur. This is so because the recovery of plaintext is easily accomplished with knowledge of two different plaintext messages encrypted with the same cipher stream C (i.e., produced from the same private key K).

Re-synchronization then requires a new exchange of public keys, followed by the independent generation of another private key and appropriate initialization of the cipher stream generators 20. This process is undesirable as it significantly delays completion of the data communication and consumes valuable communications resources (i.e., wastes bandwidth) on the channel 11 during the key exchange that could otherwise be used in carrying communications which generate revenue. Furthermore, if one of the parties to the communication comprises a mobile communications device (such as a cellular telephone) the computation of the private key is a processor intensive operation requiring a significant time expenditure and causing a significant drain on battery power resources.

The incidence of encrypted data packet loss necessitating re-synchronization is especially high in connection with those communications channels 11, such as wireless radio frequency communications channels, which suffer from interference, distortion or fading. In fact, a five to ten percent data packet loss rate in connection with the use of wireless communications channels is not uncommon. Each instance of packet loss in connection with encrypted sensitive or proprietary information data communications then unfortunately necessitates an inefficient re-synchronization. For sensitive or proprietary information data communications carried over such communications channels, there is a need then for a more efficient and effective security protocol which does not necessarily require re-synchronization in the event of a data packet loss.

SUMMARY OF THE INVENTION

To obviate the need for re-synchronization following loss of a ciphertext data packet, the present invention partitions a private key generated cipher stream into an indexed sequence of secondary keys. The secondary keys are then utilized on a selective basis to encrypt plaintext data packets for transmission over a communications channel. Each transmitted ciphertext data packet then includes an index identifying which of the plurality of secondary keys was used for the encryption. In one embodiment, each plaintext data packet is encrypted by a cipher stream generated from a different one of the secondary keys. In another embodiment, the a cipher stream generated from a single secondary key is utilized to encrypt plaintext data packets until loss of a ciphertext data packet occurs. At that point, a cipher stream generated from a next one of the plurality of secondary keys is used for encryption. In each case, however, no re-synchronization need occur as the index included with each ciphertext data packet identifies the secondary key to be used for decryption.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 3:
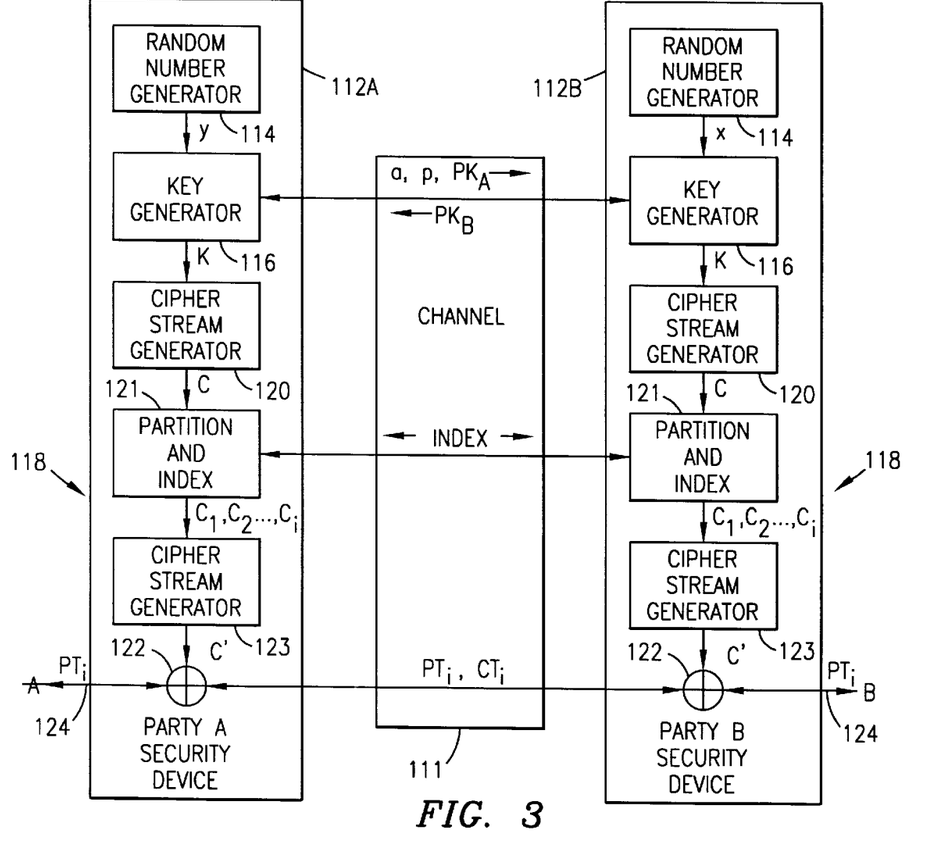
FIG. 3 is a block diagram of a secure communications system in accordance with the present invention.

Reference is now made to FIG. 3 wherein there is shown a block diagram of a secure communications system 100 in accordance with the present invention. There are two parties, Party A and Party B, to a conversation which is being carried over an unsecured communications channel 111 supported by, for example, a wireline, radio frequency, fiber optic, or the like, communications link. Each party has access to a security device 112 positioned at opposite ends of the communications channel 111. Each security device includes a random number generator 114, a key generator 116 and an encrypting/decrypting device 118 (implementing any suitable stream cipher including, for example, RC4). The encrypting/decrypting device 118 comprises a first cipher stream generator 120, a partitioning and indexing device 121, a second cipher stream generator 123 and an exclusive OR (XOR) multiplier 122.

A data communication (perhaps comprising digitized speech or data in the form of data packets) referred to as plaintext (PT) is being carried between Party A and Party B on lines 124 and over the channel 111. At this point in time, plaintext is being passed directly (i.e., without encryption) through the encrypting/decrypting device 118. A decision is then made to switch to encrypted communication. The selection of a common secret key for encrypting Party A and Party B communications may be made using any suitable public key exchange method including, for example, the Diffie-Hellman method. The random number generator 114 of the security device 112A for Party A produces a random quantity y. Key generator 116 then generates the two public quantities a and p. From these public quantities and the secret random quantity, the key generator 114 for Party A generates a public key $PK_A$ in accordance with Equation (1). The security device 112A then initiates a key exchange with the security device 112B for Party B. A triplet $(a,p,PK_A)$ is sent by the security device 112A to the security device 112B over the communications channel 111 in a key exchange message (IKE). It will be understood that to the extent a and p are previously agreed upon by Party A and Party B, they do not need to be included in the key exchange message. It will be remembered that the key exchange message is being sent without encryption. However, this is of no concern as the function for computing $PK_A$ is a one-way function (i.e., it is mathematically impossible for an eavesdropper to determine the secret random quantity y from knowledge of $PK_A$).

In response to the key exchange message, the security device 112B for Party B has its random number generator 114 produce a random quantity x. Key generator 116 then generates for Party B a public key $PK_B$ in accordance with Equation (2). The security device 112B then completes the key exchange with the security device 112A for Party A. The public key ($PK_B$) is sent by the security device 112B to the security device 112A over the communications channel 111 in a key exchange response message (EKE). It will be remembered that the key exchange response message is being sent without encryption. Again, this is of no concern as the function for computing $PK_B$ is a one-way function, and thus the eavesdropper cannot utilize mathematical processing to determine the secret random quantity x from knowledge of $PK_B$.

The key generators 116 of the security devices 112 for Party A and Party B now independently generate a shared private key K in accordance with Equations (4) and (5), respectively. While the security devices 112A and 112B are able to independently generate the same private key K, it will be recognized that an eavesdropper is unable to compute the private key, in spite of having access to the public keys $PK_A$ and $PK_B$, because knowledge of the secret random quantities x and y is unknown and cannot be mathematically determined. The private keys K are then applied to initialize the first cipher stream generators 120 which output a first cipher stream C.

This first cipher stream C is then processed by the partition and index device 121 which partitions the cipher stream into a sequence of secondary private keys $C_1$, $C_2$, ..., $C_i$. The sequence of secondary private keys $C_1$, $C_2$, ..., $C_i$ is then applied to initialize the second cipher stream generators 123 which output a second cipher stream C'. This second cipher stream C' is then either exclusively ORed 122 with the plaintext sequence ($PT_i$) to generate ciphertext ($CT_i$) for transmission over the channel 111, or exclusively ORed with received ciphertext to generate plaintext. Each secondary private key $C_i$ is further provisioned by the device 121 with a uniquely identifying index. The index indicating which secondary private key $C_i$ is being used to encrypt a particular plaintext sequence $PT_i$ is communicated over the channel 111 to ensure synchronization and the utilization of the correct key for decryption. This index may be exchanged between the security devices 112 in un-encrypted form because it bears no information concerning the secondary private key $C_i$ other than a sequence (i.e., indexing) number.

Figure 4:
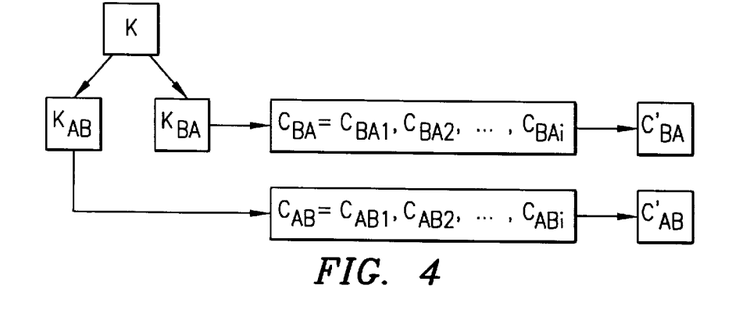
FIG. 4 is a flow diagram for secondary private key generation.

Reference is now made to FIG. 4 wherein there is shown a flow diagram for secondary private key generation. For a bi-directional data communication between Party A and Party B as illustrated in FIG. 3, the private key K actually comprises (i.e., may be split into) two keys $K_{AB}$ and $K_{BA}$. The need for two private keys when handling bi-directional communications is required to ensure that the same cipher stream is never used for the encryption of different plaintext sequences. The first private key $K_{AB}$ is used to generate a forward first cipher stream $C_{AB}$, and the second private key $K_{BA}$ is used to generate a reverse first cipher stream $C_{BA}$. The forward first cipher stream $C_{AB}$ is then partitioned and indexed to generate a first (or forward channel) secondary private key $C_{ABi}$ sequence, with individual ones in the sequence used to generate a forward second cipher stream $C_{AB}'$ that is used by security device 112A to encrypt Party A $PT_i$ data communications, and by security device 112B to decrypt Party A $CT_i$ data communications. The reverse first cipher stream $C_{BA}$, on the other hand, is then partitioned and indexed to generate a second (or reverse channel) secondary private key $C_{BAi}$ sequence, with individual ones in the sequence used to generate a reverse second cipher stream $C_{BA}'$ that is used by security device 112B to encrypt Party B $PT_i$ data communications, and by security device 112A to decrypt Party B $CT_i$ data communications.

Figure 5:
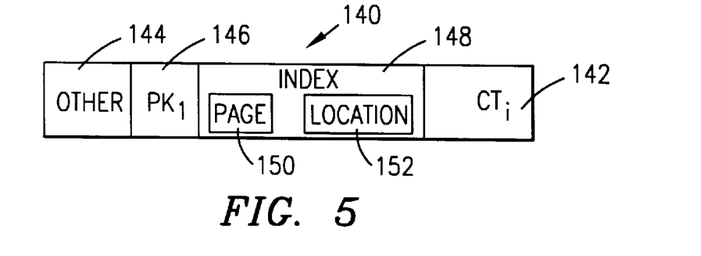
FIG. 5 is a simplified format used for the transmission of an encrypted data communication in accordance with the present invention.
Figure 6:
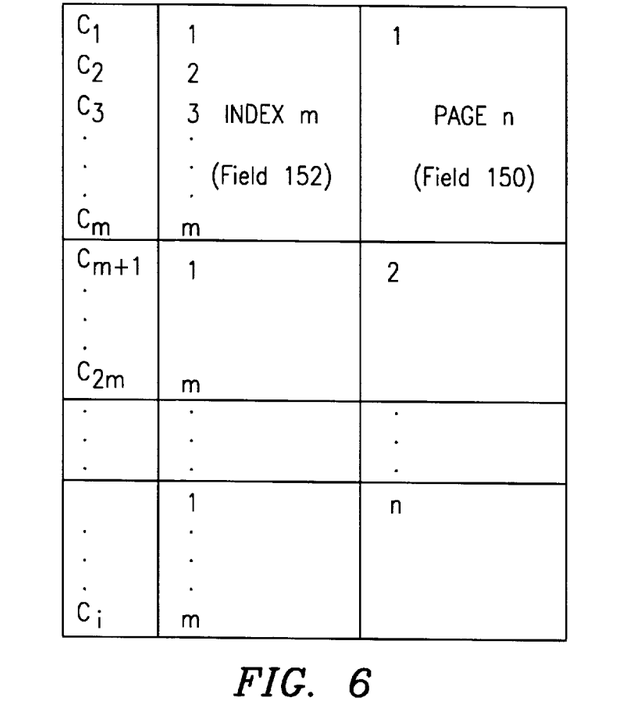
FIG. 6 is a diagram illustrating a page organization of the sequence of secondary private keys.

Reference is now made to FIG. 5 wherein there is shown a simplified format 140 used for the transmission of an encrypted data communication segment ($CT_i$) 142 in accordance with the present invention. The format 140 includes a plurality of fields (OTHER) 144 relating, for example, to packet reconstruction, compression and network layer protocol, which are not relevant to the present invention. The format further includes a primary key index field (PKI) 146 which indicates the parity of the primary encryption/decryption key K used to generate the plurality of secondary keys $C_i$. A secondary key index field 148, comprising a page identification 150 and a location (on the page) identification 152, is also included in the format 140. As noted above, a sequence of secondary private keys $C_1$, $C_2$, ..., $C_i$ is generated. The i generated keys are arranged in n groups (or pages) of m keys each. The page identification 152 accordingly identifies which of the n groups of keys is being used to encrypt the data. The location identification 152 then identifies which particular one of the m keys on the identified page n is being used to encrypt the data. This page organization of the sequence of secondary private keys $C_1$, $C_2$, ..., $C_i$ is illustrated in FIG. 6.

Figure 7:
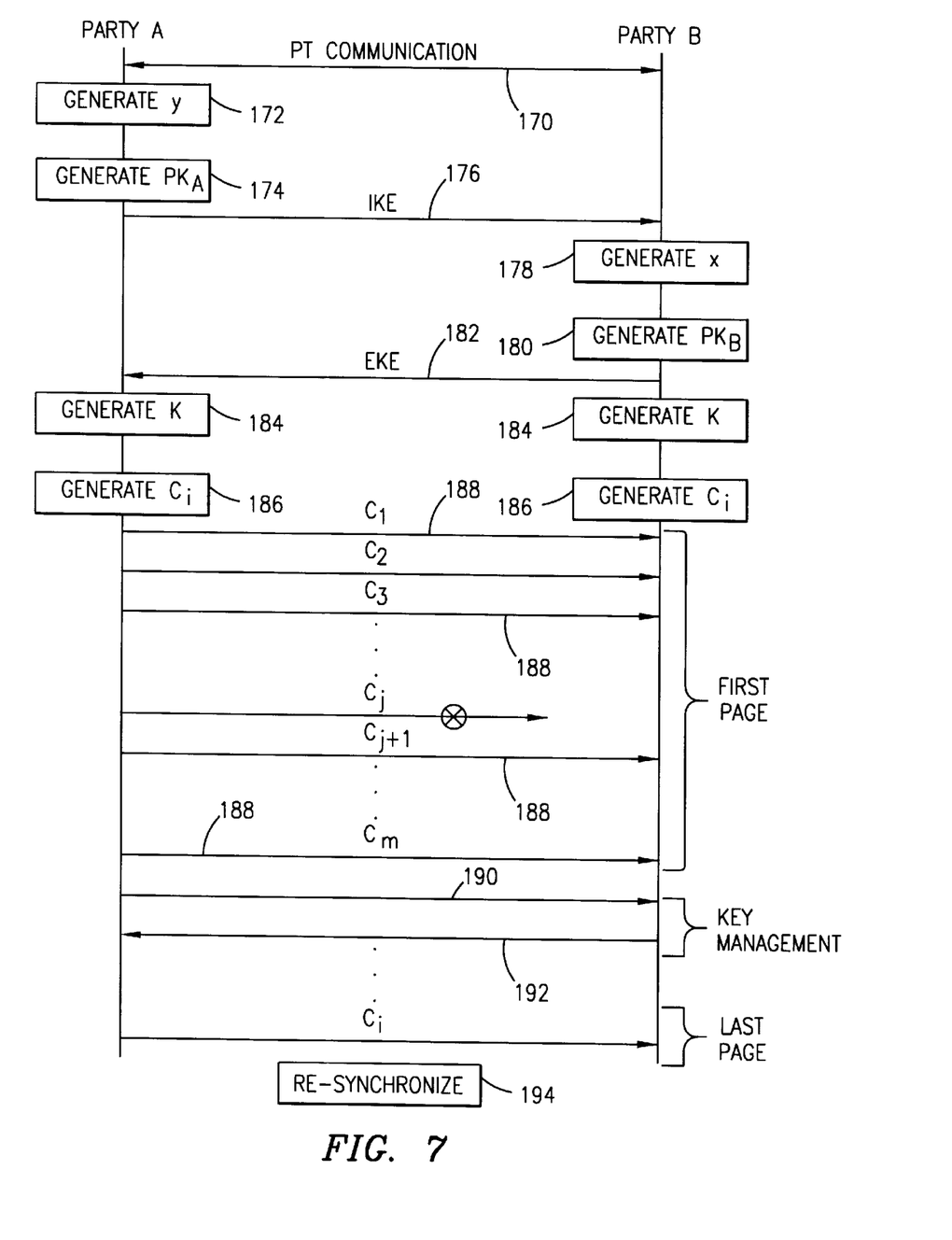
FIG. 7 is a signal flow diagram illustrating the key exchange, encrypted data communication, and re-synchronization processes of the present invention.

Reference is now made to FIG. 7 wherein there is shown a signal flow diagram illustrating the key exchange, encrypted data communication, and re-synchronization processes of the present invention. Party A and Party B are engaged in a plaintext communication 170. The public key exchange process is then initiated with Party A generation of the secret quantity y (action 172) and the public key $PK_A$ (action 174). The key exchange message (IKE) 176 is then sent to Party B. Party B responds by generating secret quantity x (action 178) and the public key $PK_B$ (action 180). The key exchange response message (EKE) 182 is then sent to Party A. Party A and Party B then independently generate (action 184) the private key K from which the sequence of secondary private keys $C_1, C_2, \ldots, C_i$ is generated (action 186).

In order to simplify the illustration, only the encryption of data communications 188 transmitted from Party A to Party B is shown. A first plaintext sequence $PT_1$ is then encrypted using a second cipher stream C' generated from the first one of the secondary private keys $C_1$ to produce a first ciphertext sequence $CT_1$. A similar process is used to produce a second ciphertext sequence $CT_2$ from a second cipher stream C' generated from the second one of the secondary private keys $C_2$. This process continues for each of the subsequent plaintext sequences $PT_i$.

It is noted, however, that with respect to the j-th plaintext sequence $PT_j$ encrypted with a second cipher stream C' generated from the secondary private key $C_j$, the ciphertext sequence $CT_j$ was not successfully transmitted (as indicated by "X"). In accordance with the prior art process as illustrated in FIG. 2, this packet loss would require an immediate re-synchronization necessitating a new public key exchange and cipher stream initialization. In the present invention, synchronization is maintained allowing for continued packet transmission starting with the ciphertext sequence $CT_{j+1}$ encrypted using a second cipher stream C' generated from the secondary private key $C_{j+1}$. The reason synchronization is maintained is that each ciphertext sequence $CT_i$ is formatted for transmission (FIG. 5) to include information (index 148) identifying which secondary key (page and location) should be utilized in generated the second cipher stream C' needed for decrypting the transmission. As plural keys have been negotiated and the current encryption key can be identified, there is no need to negotiate a new key for continuing with the communication.

Following the processing of one page of data packets (i.e., the encryption of m plaintext sequences $PT_i$ with individual second cipher streams C' generated from m secondary private keys $C_i$), a key management message 190 is sent from Party A to Party B. This message 190 identifies the index m and page n that Party A is using to encrypt (and/or decrypt) data communications. Responsive to the message 190, Party B sends a key management response message 192 confirming its coordinated use of a secondary private key from the same page n, and index m therein, for encryption and decryption. Encryption in the foregoing manner utilizing a second cipher stream C' generated from an appropriate next secondary secret key then ensues. Key management occurs following the use of a last secondary secret key of a page.

Then, following the processing of all pages of data packets (i.e., the encryption of i plaintext sequences $PT_i$, the last one being encrypted with a second cipher stream C' generated from the secondary private key $C_i$), the process re-synchronizes 194 to invoke the generation of a new set of secondary private keys (actions 184 and 186). Accordingly, secret quantities must be selected (actions 172 and 178), public keys generated (actions 174 and 180), and key exchange messages (IKE/EKE) 176 and 182 sent.

Figure 8:
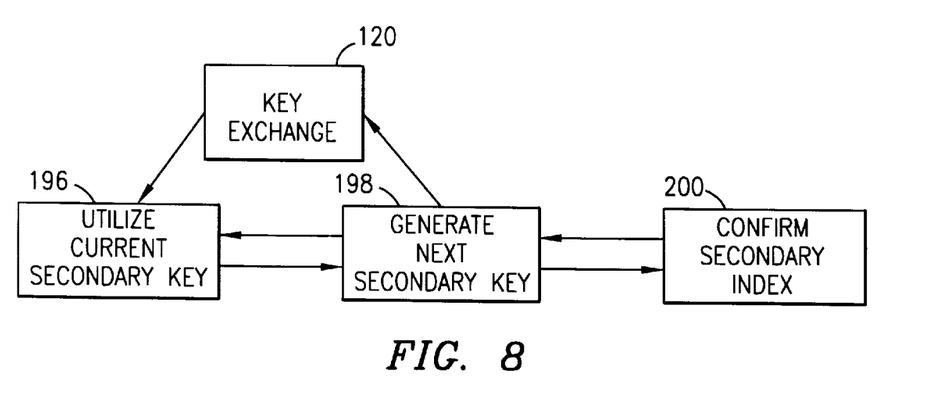
FIG. 8 is a state control diagram illustrating an encryption key management process of the present invention.

Reference is now made to FIG. 8 wherein there is shown a state control diagram illustrating an encryption key management process of the present invention. In normal operation, the protocol state for key management transitions between a utilize current secondary private key state 196 and a generate next secondary private key state 198. In state 196, a data packet is either encrypted or decrypted using a second cipher stream generated from the current secondary private key. A transition is then made, following each encryption/decryption, to state 198 where a next secondary private key is generated. A transition is then made back to state 196 where this newly generate secondary private key becomes the current one for use in generating the second cipher stream needed for encrypting or decrypting a next data packet.

Maintenance of synchronization between Party A and Party B as to the proper secondary private key is accomplished through either a passive operation, an active secondary key operation, or an active primary key operation. In passive operation, no message exchange between Party A and Party B regarding synchronization is required as the index is merely passively incremented with each encryption or decryption and monitoring of the index field 148 (FIG. 5) of each sent ciphertext sequence $CT_i$.

In active secondary key operation, a transition is made from state 198 to a confirm secondary index state 200. In the state 198, key management messages 190 and 192 (FIG. 7) are exchanged between Party A and Party B confirming coordinated use of a secondary private key from the same page n, and index m therein, for encryption and decryption. Once secondary key confirmation has been received, a transition is made back to state 198. With respect to the page organization of secondary private keys $C_i$ illustrated in FIG. 6, state 200 is entered into following the completed transmission of one page worth of data packets.

In active primary key operation, a transition is made from state 198 to a key exchange state 202. In state 202, a re-synchronization is performed to invoke the generation of a new set of secondary private keys (actions 184 and 186 of FIG. 7) by selecting new secret quantities, generating new public keys generated and sending key exchange messages (IKE/EKE). With respect to the page organization of secondary private keys $C_i$ illustrated in FIG. 6, state 202 is entered into following the completed transmission of all n pages worth of data packets.

Simplified pseudo code describing state transitions in FIG. 8 with respect to passive secondary key operation may be written as follows:

IF request for next secondary private key
THEN increment index
IF index<=m
THEN {use secondary key at incremented index location}
IF index>m AND page<n
THEN initiate active secondary key operation
ELSE {full sequence of secondary private keys $C_i$ used, initiate active primary key operation}

Simplified pseudo code describing state transitions in FIG. 8 with respect to encrypting side active secondary key operation may be written as follows:

IF secondary key requested>m
THEN reset index
IF page<=n
THEN {send key management message to peer (decrypting entity) identifying next page}

IF peer responds and confirms
THEN {increment page, use first secondary private key at incremented page location}
ELSE IF {error regarding key management message}
THEN repeat procedure
ELSE {full sequence of secondary private keys $C_i$ and secondary key pages used, initiate active primary key operation}

Simplified pseudo code describing state transitions in FIG. 8 with respect to decrypting side active secondary key operation may be written as follows:

IF {key management message received from peer (encrypting entity) identifies page greater than current page}
THEN {increment page to match identified page respond to key management message
 IF {data packet received with page index set to incremented page}
 THEN {initialize decryption using secondary key indexed from incremented page}
}

Simplified pseudo code describing state transitions in FIG. 8 with respect to Party A active primary key operation may be written as follows:

IF new primary keys are required
THEN construct and send IKE message (plaintext)
IF {receive EKE message responsive to IKE message}
THEN {execute public key algorithms, deduce new private key and secondary private keys}
ELSE IF error regarding IKE message
THEN complete procedure or retransmit IKE
IF receive an EKE message (response required)
THEN discard EKE message
IF receive an EKE message (response required)
THEN construct and transmit an IKE message (plaintext)

Simplified pseudo code describing state transitions in FIG. 8 with respect to Party B active primary key operation may be written as follows:

IF new primary keys are required
THEN construct and send EKE message (plaintext)
IF receive IKE message
THEN {execute public key algorithms, deduce new private key and secondary private keys}
IF receive IKE message (response required)
THEN {construct and transmit EKE message (plaintext), execute public key algorithms, deduce new private key and secondary private keys, advance index}
ELSE IF error regarding EKE message
THEN complete procedure
IF receive IKE message (response required)
THEN {construct and transmit EKE message (plaintext), execute public key algorithms, deduce new private key and secondary private keys, advance index}

Reference is now once again made to the state control diagram of FIG. 8 for a description of an alternative embodiment of the present invention. It will be remembered that in connection with the prior description, the protocol state for key management transitions between the current secondary private key state 196 and the generate next secondary private key state 198. The transition from state 196 (data packet encryption/decryption using the current secondary private key) to state 198 (where a next secondary private key is generated) occurs after each such encryption/decryption operation on a data packet. In the current embodiment, this transition occurs only each time that a data packet delivery fails. Thus, a second cipher stream C' generated from a single secondary private key is used to encrypt/decrypt plural data packets. It is only when a packet delivery failure occurs that the index is incremented and a new secondary private key is accessed for use. As before, maintenance of synchronization between Party A and Party B as to the proper secondary private key for use is accomplished through either the passive operation, the active secondary key operation, or the active primary key operation.

Figure 9:
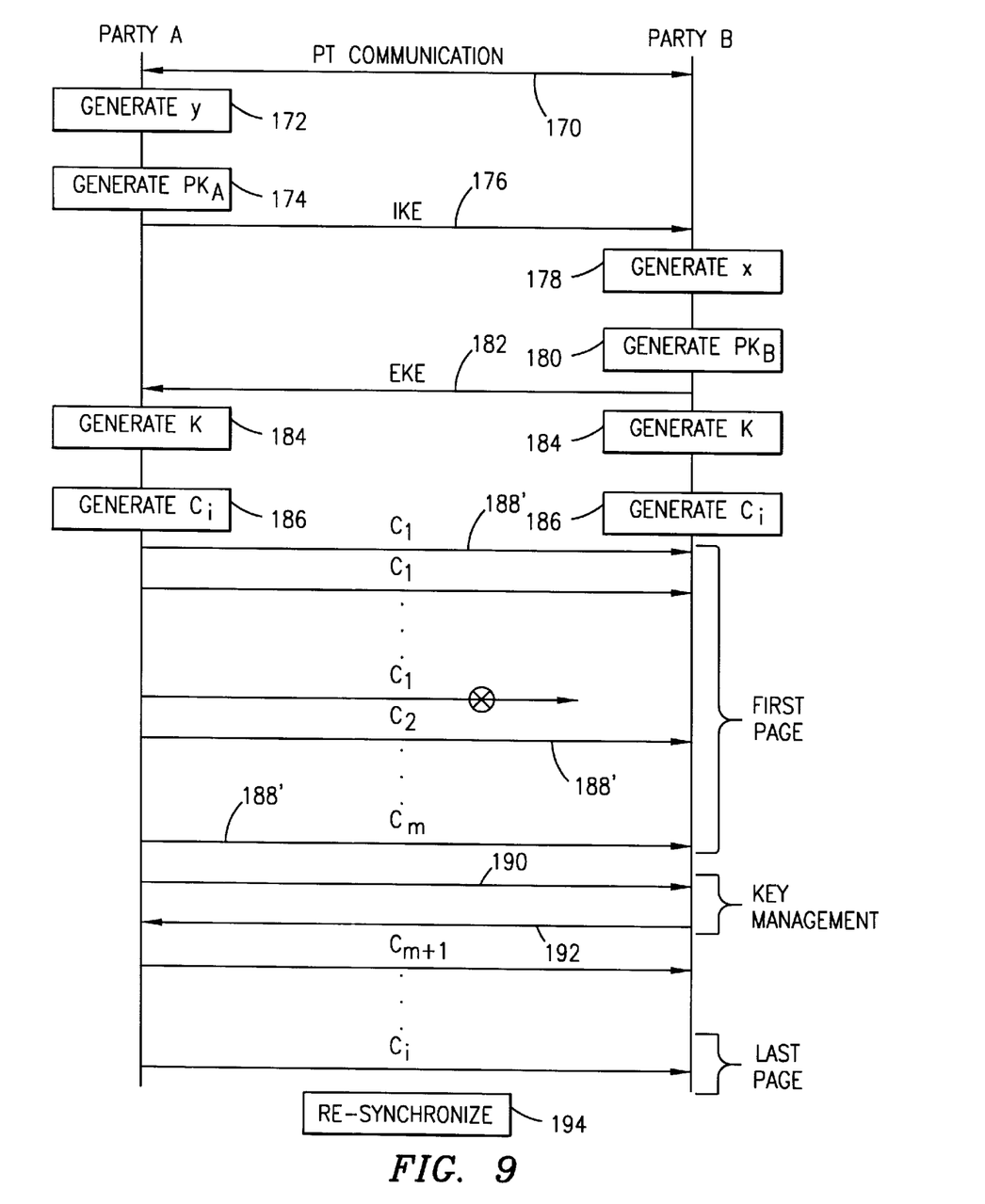
FIG. 9 is a signal flow diagram illustrating the key exchange, encrypted data communication, and re-synchronization processes of an alternative embodiment for the present invention.

Reference is now made to FIG. 9 wherein there is shown a signal flow diagram illustrating the key exchange, encrypted data communication, and re-synchronization processes of an alternate embodiment for the present invention. Party A and Party B are engaged in a plaintext communication 170. The public key exchange process is then initiated with Party A generation of the secret quantity y (action 172) and the public key $PK_A$ (action 174). The key exchange message (IKE) 176 is then sent to Party B. Party B responds by generating secret quantity x (action 178) and the public key $PK_B$ (action 180). The key exchange response message (EKE) 182 is then sent to Party A. Party A and Party B then independently generate (action 184) the private key K from which the sequence of secondary private keys $C_1, C_2, \ldots, C_i$ is generated (action 186).

In order to simplify the illustration, only the encryption of data communications 188' transmitted from Party A to Party B is shown. A first one of the secondary private keys $C_1$ is used to generate a second cipher stream C' for encrypting plural plaintext sequences PT and producing corresponding ciphertext sequences CT. The use of the second cipher stream C' generated from a single secondary private key $C_1$ to encrypt plaintext sequences continues until such time as a delivery failure occurs (as indicated by "X"). At that point, a next one of the secondary private keys $C_2$ is used to generate a new second cipher stream C' for encrypting subsequent plural plaintext sequences PT and producing corresponding ciphertext sequences CT. Again, as in the prior embodiment, the reason synchronization is maintained in spite of delivery failure is that each ciphertext sequence CT is formatted for transmission (FIG. 5) to include information (index 148) identifying which secondary key should be utilized to generate the second cipher stream C' needed for decrypting the transmission. As the encryption key can be identified, there is no need to negotiate a new key for continuing with the communication.

Following the use one page worth (i.e., m in number) of secondary private keys $C_i$ to generate corresponding second cipher streams C' each encrypting a plurality of plaintext sequences PT, a key management message 190 is sent from Party A to Party B. This message 190 identifies the index m and page n that Party A is using to encrypt (and/or decrypt) data communications. Responsive to the message 190, Party B sends a key management response message 192 confirming its coordinated use of a secondary private key from the same page n, and index m therein, for encryption and decryption. Encryption in the foregoing manner utilizing a second cipher stream C' generated from an appropriate next secondary secret key then ensues. Key management occurs following the use of a last secondary secret key of a page. Then, following the use of all pages (i.e., n in number) of secondary private keys $C_i$ to generate second cipher streams C' for encrypting a plurality of plaintext sequences PT (the last sequence of data packets being encrypted with a second cipher stream generated from the secondary private key $C_i$), the process re-synchronizes 194 to invoke the generation of a new set of secondary private keys (actions 184 and 186). Accordingly, secret quantities must be selected (actions 172 and 178), public keys generated (actions 174 and 180), and key exchange messages (IKE/EKE) 176 and 182 are sent.

The pseudo code previously provided is equally applicable to this embodiment, with minor modification as necessary to account for the operational difference between utilizing a new key with each sequence/packet and using a new key with each delivery failure.

It will be recognized that this embodiment of the present invention utilizes secondary private keys at a much lower rate than the preceding embodiment. Thus, key management transactions (190 and 192) as well as re-synchronization actions (194) occur less frequently, and a more efficient use of limited bandwidth communications resources is made.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A private key generator, comprising:
   a first generator for generating a private key;
   a second generator initialized with the private key for generating a first cipher stream;
   a partitioner that partitions the first cipher stream into a plurality of secondary keys for use in generating corresponding second cipher streams to encrypt plaintext information into ciphertext information; and
   an indexer for indexing the plurality of secondary keys, an index included with the ciphertext information identifying which of the indexed plurality of secondary keys was used in encrypting the plaintext information.

2. The private key generator as in claim 1 further including:
   means for exchanging public keys; and
   wherein the first generator functions to generate the private key from processing at least one of the exchanged public keys.

3. The private key generator as in claim 1 wherein the plaintext information comprises a plurality of plaintext packets, each plaintext packet encrypted with a second cipher stream generated from a different one of the secondary keys.

4. The private key generator as in claim 1 wherein the plaintext information comprises a plurality of plaintext packets, each sequence of plaintext packets handled between instances of ciphertext information loss encrypted with a second cipher stream generated from a different one of the secondary keys.

5. The private key generator as in claim 1 wherein the first generator generates a new private key when each of the generated plurality of secondary keys from a prior private key has been used for encryption.

6. A method for generating a private key, comprising the steps of:
   generating a private key;
   generating a first cipher stream initialized from the generated private key;
   partitioning the first cipher stream into a plurality of secondary keys for use in generating corresponding second cipher streams to encrypt plaintext information into ciphertext information; and
   indexing the plurality of secondary keys, an index included with the ciphertext information identifying which of the indexed plurality of secondary keys was used in encrypting the plaintext information.

7. The method as in claim 6 further including the steps of:
   exchanging public keys; and
   generating the private key from processing at least one of the exchanged public keys.

8. The method as in claim 6 wherein the plaintext information comprises a plurality of plaintext packets, further including the steps of:
   generating a plurality of second cipher streams, each second cipher stream initialized from a different one of the secondary keys; and
   encrypting each plaintext packet with a different one of the plurality of second cipher streams.

9. The method as in claim 6 wherein the plaintext information comprises a plurality of plaintext packets, further including the steps of:
   generating a plurality of second cipher streams, each second cipher stream initialized from a different one of the secondary keys; and
   encrypting each sequence of plaintext packets handled between instances of ciphertext information loss with a different one of the plurality of second cipher streams.

10. The method as in claim 6 further including the step of repeating the steps of claim 6 when each of the generated plurality of secondary keys has been used for encryption.

11. An encryption device, comprising:
    a first generator for generating a private key;
    a second generator initialized with the private key for generating a first cipher stream;
    a partitioner for partitioning the first cipher stream into a plurality of secondary keys;
    an indexer for indexing the plurality of secondary keys;
    means for encrypting plaintext information into ciphertext information using second cipher streams generated from the plurality of secondary keys; and
    means for including an index with the ciphertext information identifying which of the indexed plurality of secondary keys was used in encrypting the plaintext information.

12. The encryption device as in claim 11 further including:
    means for exchanging public keys; and
    wherein the first generator functions to generate the private key from processing at least one of the exchanged public keys.

13. The encryption device as in claim 11 wherein the plaintext information comprises a plurality of plaintext packets, and wherein the means for encrypting comprises:
    a third generator initialized with the secondary keys for generating corresponding second cipher streams; and
    means for encrypting each plaintext packet with a different one of the second cipher streams.

14. The encryption device as in claim 11 wherein the plaintext information comprises a plurality of plaintext packets, and wherein the means for encrypting comprises:
    a third generator initialized with the secondary keys for generating corresponding second cipher streams; and
    means for encrypting each one of a plurality of sequences of plaintext packets that is handled between instances of ciphertext information loss with a different one of the second cipher streams.

15. The encryption device as in claim 11 wherein the first generator generates a new private key when each of the generated plurality of secondary keys from a prior private key has been used for encryption.

16. A method for encrypting, comprising the steps of:

generating a private key;

generating a first cipher stream initialized from the generated private key;

partitioning the first cipher stream into a plurality of secondary keys;

indexing the plurality of secondary keys;

encrypting plaintext information into ciphertext information using second cipher streams generated from the plurality of secondary keys; and including with the ciphertext information an index identifying which of the indexed plurality of secondary keys was used in encrypting the plaintext information.

17. The method as in claim 16 further including the steps of:

exchanging public keys; and generating the private key from processing at least one of the exchanged public keys.

18. The method as in claim 16 wherein the plaintext information comprises a plurality of plaintext packets, and the step of encrypting comprises the steps of:

generating second cipher streams each initialized from a different one of the plurality of secondary keys; and encrypting each plaintext packet with a different one of the second cipher streams.

19. The method as in claim 16 wherein the plaintext information comprises a plurality of plaintext packets, and the step of encrypting comprises the steps of:

generating second cipher streams each initialized from a different one of the plurality of secondary keys; and encrypting each sequence of plaintext packets handled between instances of ciphertext information loss with a different one of the second cipher streams.

20. The method as in claim 16 further including the step of repeating the steps of claim 16 when each of the generated plurality of secondary keys has been used for encryption.

* * * * *